Oct. 10, 1944.  W. F. OHME ET AL  2,360,156
MACHINE FOR WASHING DRINKING VESSELS
Filed March 7, 1942  5 Sheets-Sheet 1
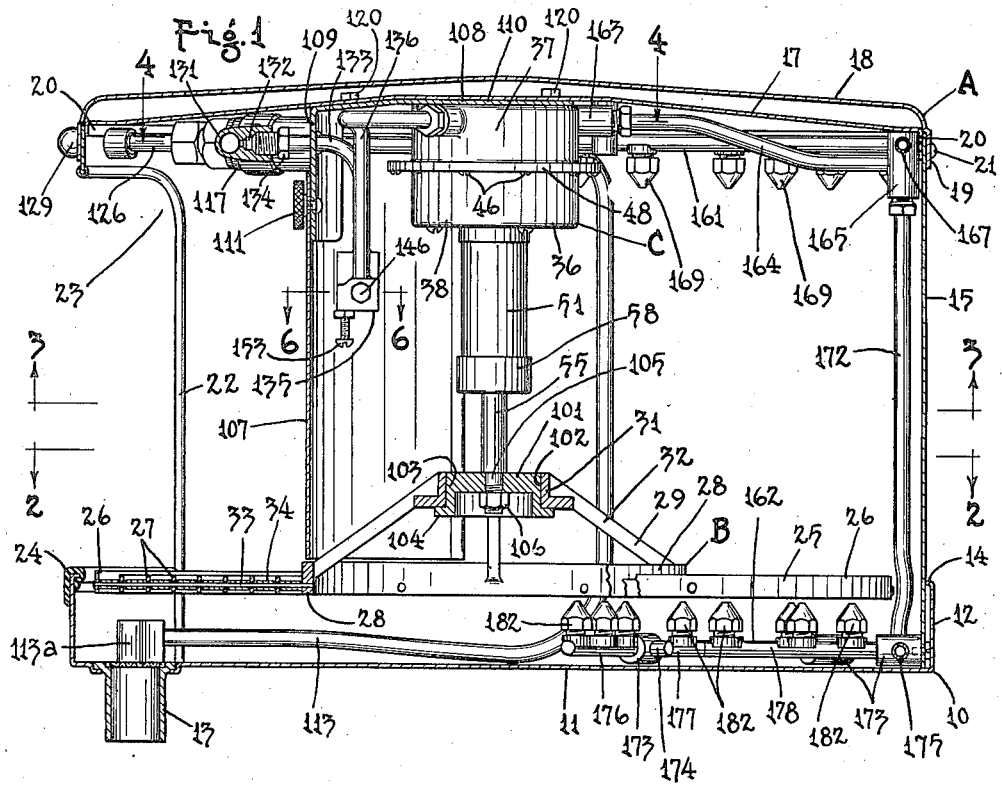
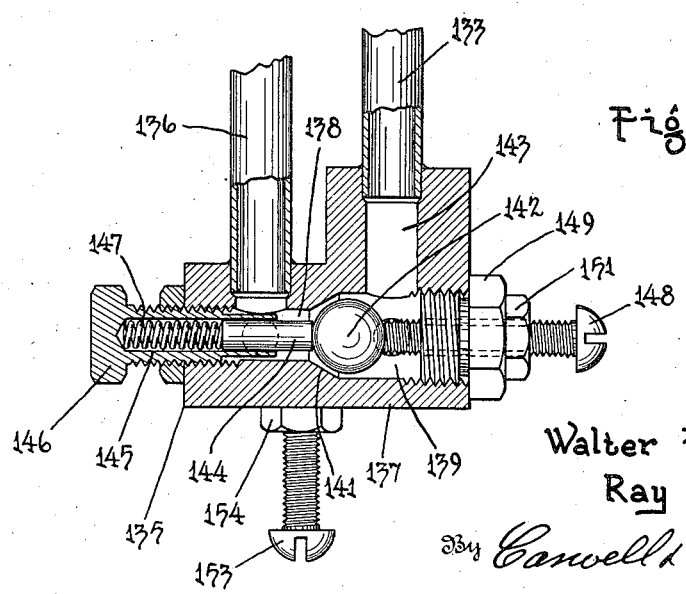
Inventors
Walter F. Ohme and
Ray C. Stephan
Attorneys

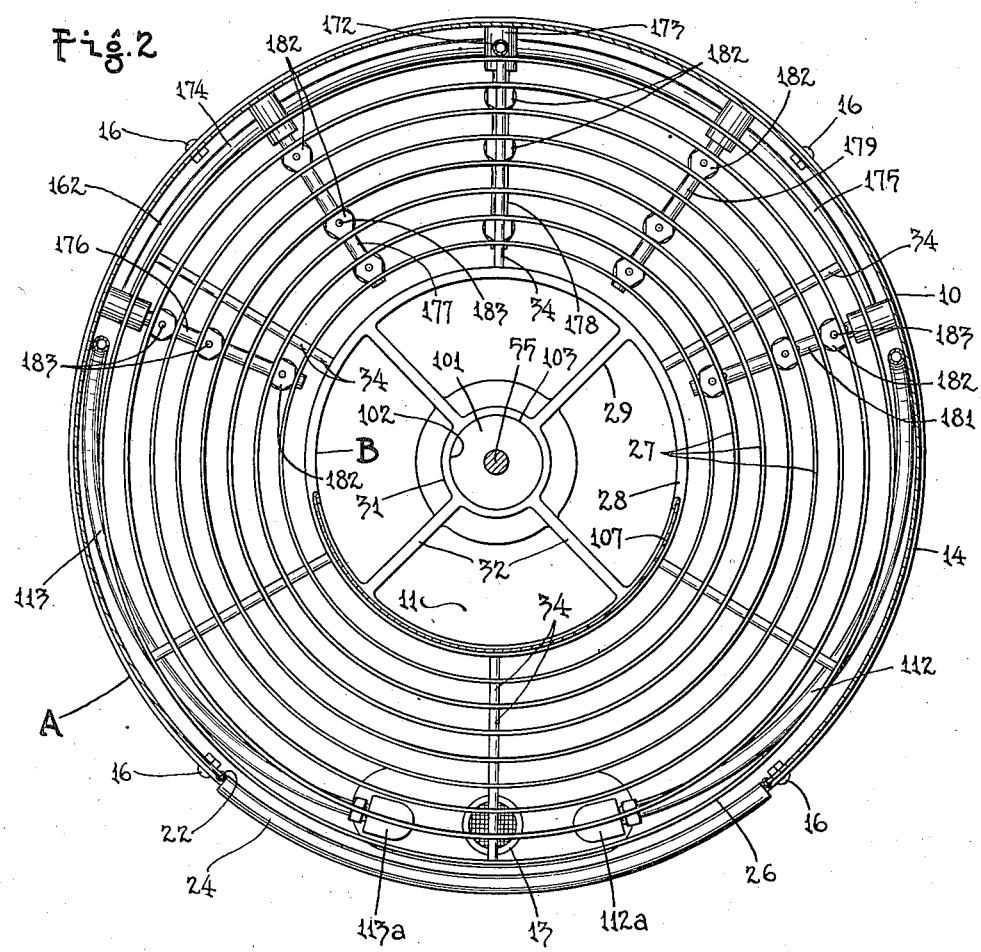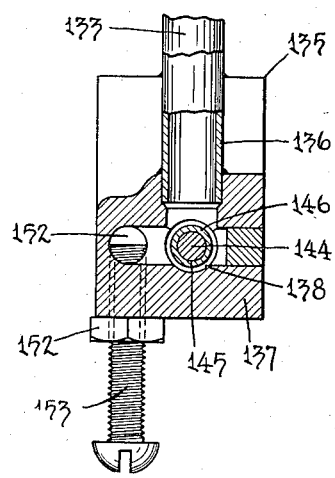

Oct. 10, 1944. W. F. OHME ET AL 2,360,156
MACHINE FOR WASHING DRINKING VESSELS
Filed March 7, 1942 5 Sheets-Sheet 3
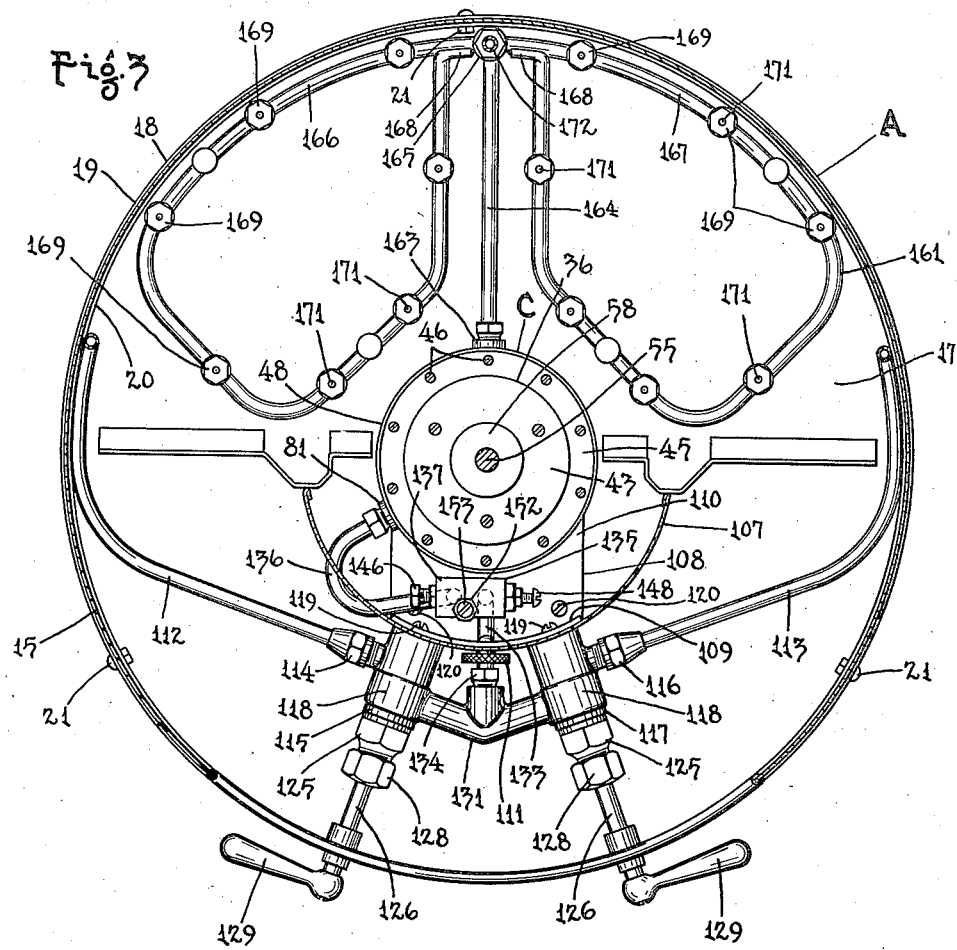
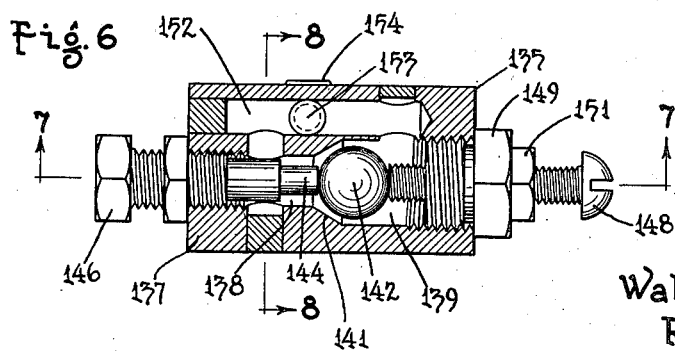
Inventors
Walter F. Ohme and
Ray C. Stephan
By Caswell & Lagaard
Attorneys

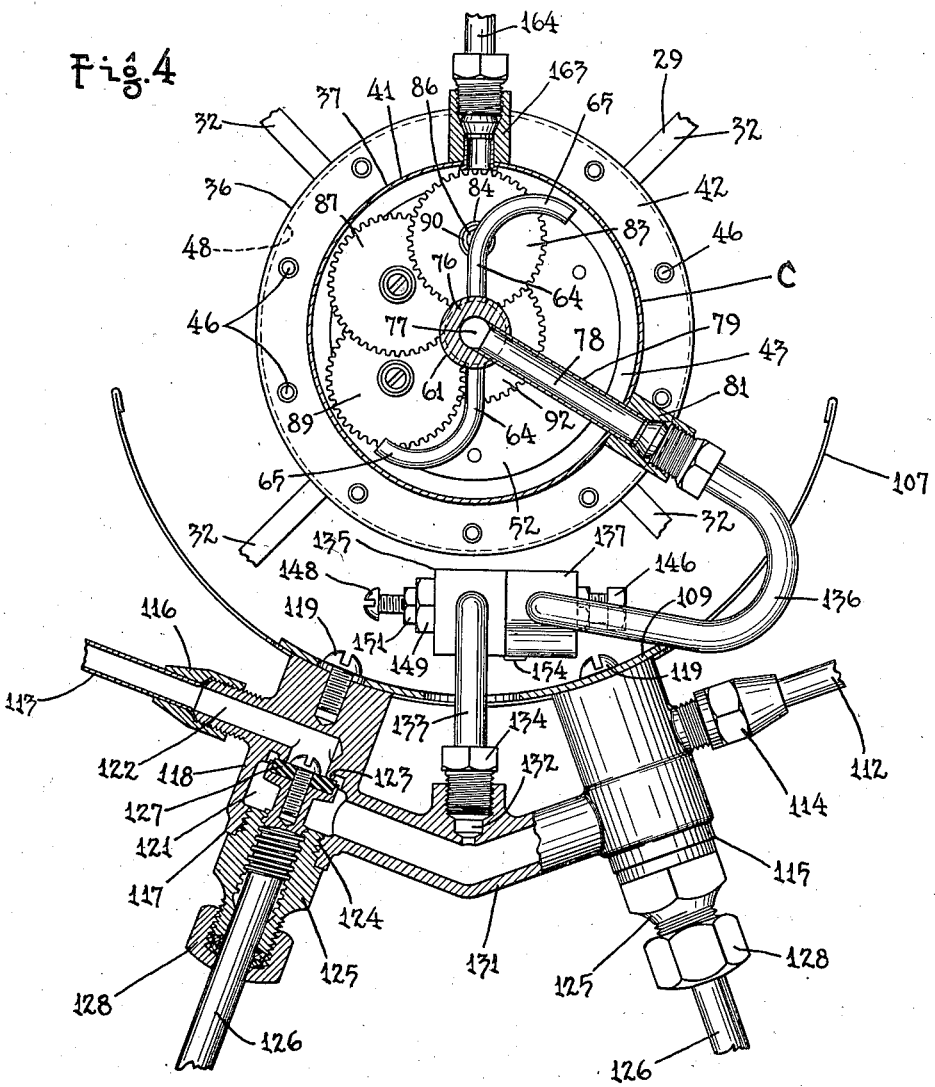

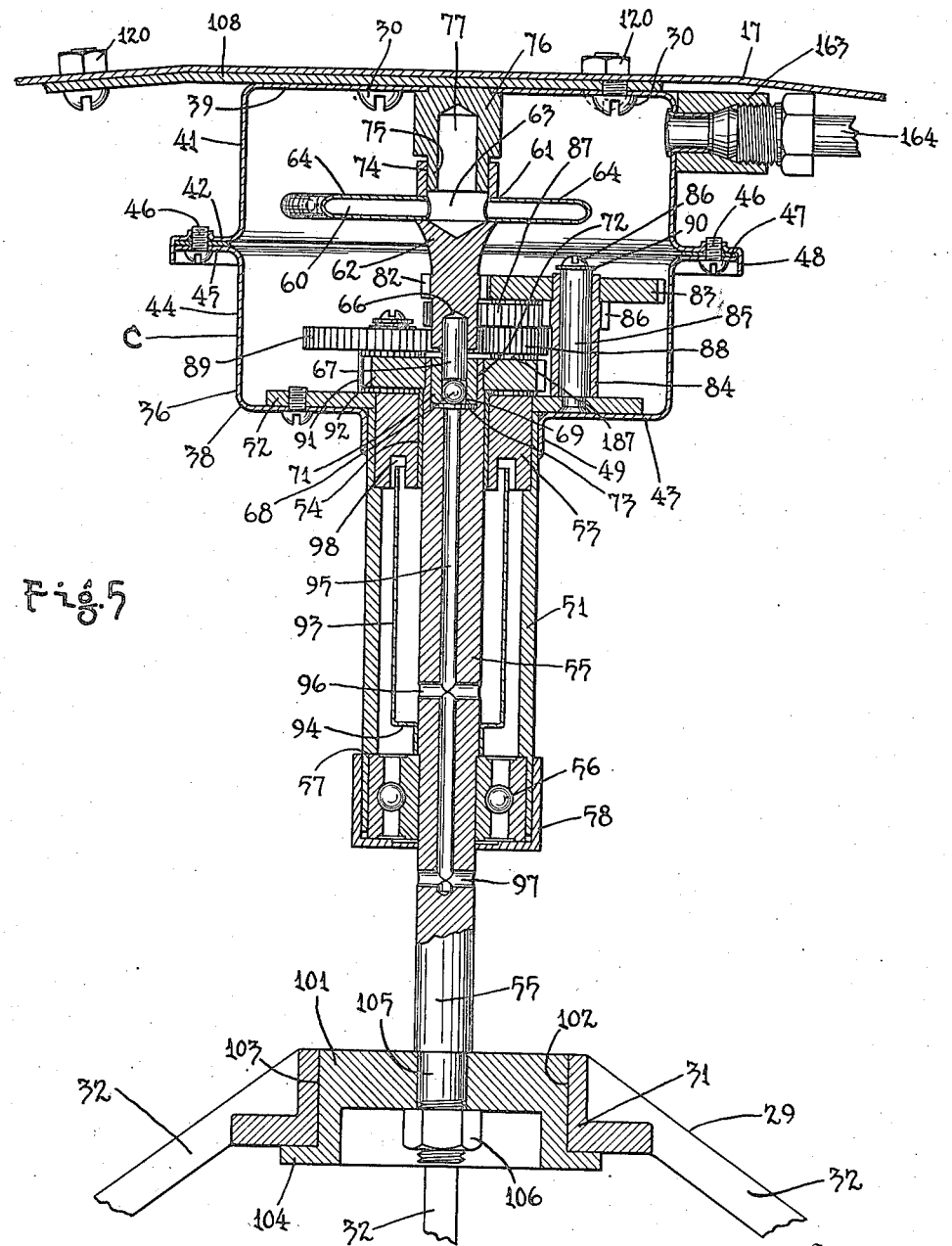

Patented Oct. 10, 1944

2,360,156

UNITED STATES PATENT OFFICE 2,360,156

MACHINE FOR WASHING DRINKING VESSELS

Walter F. Ohme and Ray C. Stephan, Minneapolis, Minn.

Application March 7, 1942, Serial No. 433,744

4 Claims. (Cl. 141—3)

Our invention relates to machines for washing drinking vessels and has for an object to provide a machine in which drinking vessels may be inserted and from which the same may be removed clean and sanitary without manual handling.

An object of the invention resides in providing a machine having a revoluble rack for supporting the drinking vessels and in providing a water motor for operating the same.

A feature of the invention resides in providing a plurality of sprays between which the rack travels and by means of which the glasses are cleaned.

An object of the invention resides in utilizing the water passing through the water motor for operating the sprays.

Another object of the invention resides in providing the machine with a housing having a lateral wall structure formed with an opening therein through which access to the interior of the housing may be had and with a top extending across the upper end of the lateral wall structure.

An object of the invention resides in attaching the water motor to the top and in supporting the rack from the water motor.

A feature of the invention resides in the specific construction of the water motor.

Another object of the invention resides in providing the motor with a depending shaft and in attaching the rack to said shaft.

A still further object of the invention resides in attaching to the under side of the top a bracket and in securing to the bracket a guard for guarding the water motor and associated parts.

Another object of the invention resides in employing a valve mechanism for controlling the flow of water to the motor and in supporting the valve mechanism from the bracket.

Other objects of the invention reside in the novel combination and arrangement of parts and in the details of construction hereinafter illustrated and/or described.

In the drawings:

Fig. 1 is an elevational sectional view of a machine for washing drinking vessels, illustrating an embodiment of my invention.

Fig. 2 is a plan sectional view taken on line 2—2 of Fig. 1.

Fig. 3 is an inverted sectional view taken on line 3—3 of Fig. 1.

Fig. 4 is a fragmentary plan sectional view taken on line 4—4 of Fig. 1.

Fig. 5 is a longitudinal elevational sectional view of the motor and a portion of the rack.

Fig. 6 is a plan sectional view of the pressure-regulating valve taken on line 6—6 of Fig. 1 and drawn to a greater scale.

Fig. 7 is an elevational sectional view taken on line 7—7 of Fig. 6.

Fig. 8 is a cross sectional view taken on line 8—8 of Fig. 6.

Our invention comprises a housing which we have indicated in its entirety by the reference character A, and in which the washing mechanism of the invention is disposed. The washing mechanism of the invention comprises a revolving rack B, driven through a water motor C. A series of sprays, to be later described, spray water on the glasses carried by the rack, as the rack is rotated past the sprays. These various parts will now be described in detail.

The housing A consists of a tray 10, circular in form, which is constructed with a bottom 11 having a rim 12 extending upwardly therefrom. The bottom 11 is preferably sloping toward the forward portion of the tray, where a drain 13 is provided by means of which the water discharged into the housing may be removed from the machine. The tray 10 may be constructed as a stamping, or the same may be spun from sheet metal, or constructed in any other suitable manner. The housing further comprises a circular wall 15, which is disposed within the rim 12 of tray 10, resting upon the bottom thereof. A lip 14 at the upper edge of the rim 12 engages the wall 15 and makes a tight connection therewith. A number of bolts 16 pass through the said rim and wall, and attach the wall to the tray 10. To the upper portion of the wall 15 is attached a top 17 which is provided with a flange 20 welded or brazed to the wall 15. The top 17 forms a support for the motor C and certain of the sprays of the invention. A cover 18 fits over the top 17 and conceals the bolts used for securing the motor to the said top. This cover is constructed with a skirt 19 which extends downwardly therefrom and which overlies the outer surface of the wall 15. The cover 18 may be secured to the wall 15 by means of bolts 21 or in any other suitable manner. The wall 15 is constructed at the forward portion thereof with an opening 23 at the front of the housing, through which access may be had to the interior thereof and to the glasses placed on the rack B. A split tube 22, constructed of rubber or some similar material, receives the free edge of the wall 15 at the opening 23 and forms a protection for the same. A similar protecting member 24 also constructed of rubber, encircles the portion of the rim 12 of tray 10, exposed at the opening 23.

The rack B comprises a table 25 which is constructed of a number of circularly disposed, concentrically arranged rings 26, 27 and 28. The ring 28 forms part of a spider 29 having a hub 31 and arms 32 extending between said hub and the ring 28. These rings are connected together through radially extending rods 33 which extend through the same. Sleeves 34, mounted on these rods, hold the rings in proper relation. The ends of the rods 33 are riveted over the innermost ring 28 and the outermost ring 26 to hold the parts in properly assembled position. The rings 26, 27 and 28 all lie with their edges in a common horizontal plane, so as to form a suitable support for the glasses. The surface formed by the upper edges of these rings is substantially at the elevation of the upper surface of the member 24 at the lowermost portion of the opening 23, so that glasses inserted into the housing A through the opening 23 may be easily placed upon the table 25. The rack B is rotatably supported by and driven by the motor C, as will be presently explained in detail.

The motor C is best shown in Figs. 4 and 5, and consists of a case 36 formed of sheet metal and constructed in two halves, 37 and 38. The half 37 is formed with a top 39 and a circumferential wall 41 provided at its periphery with a flange 42. The half 38 is similarly constructed with a bottom 43 having a circumferential wall 44 connected thereto and a flange 45 issuing from the uppermost portion thereof. The two halves of the case are secured together by means of machine screws 46 which pass through the flange 45 and are screwed into the flange 42. Between these flanges is disposed a gasket 47 by means of which a fluid-tight connection is formed between the two parts of the case. A lip 48, depending from the flange 42, serves to center the half 38 of the case 36 with reference to the half 37 thereof. The motor C is attached to the top 17 of housing A by means of a bracket 108. This bracket has a base 110 which is secured to the top 17 by means of bolts 120 which pass jointly through the same. A number of screws 30 extend through the top 39 of the case 36 of said motor and are threaded into the base 110 of bracket 108.

The bottom 43 of case 36 has issuing from it a neck 49 which receives a sleeve 51 depending from the case. This sleeve may be secured to the neck by soldering, brazing or otherwise, and is rigidly attached thereto.

In the interior of the case 36 is a plate 52 which has attached to it a boss 53 adapted to extend into the uppermost portion of the sleeve 51. This boss has mounted in it a bearing 54 rotatably supporting a shaft 55 at its upper end. Shaft 55 is rotatably mounted at its lower end in a ball bearing 56 which is received within an annular recess 57 in the lower end of the sleeve 51. A cap 58, engaging the outer race of the bearing 56, holds the same in position. The inner race of the bearing is pressed on the shaft 55.

Within the case 36 is disposed a rotor 61. This rotor consists of a hub 62 which is formed with a chamber 63 within the same. Two bent tubes 64 having bores 60 therein are attached to this hub and are arranged in oppositely extending radial directions. The ends 65 of these tubes are bent to extend substantially circumferentially. The outer ends 65 of the bores 60 of these tubes are open and communicate with the interior of the case 36, while the inner ends of said bores communicate with the chamber 63. The lower end of the hub 62 of rotor 61 is provided with a bore 66 which receives a hardened pin 67. Pin 67 rests on a ball 68 which is mounted in a bore 69 in a bushing 71, set into a socket 72 formed in the upper end of the shaft 55. A disk 73 of hardened material is received within the lowermost portion of the socket 72 and forms a support for the ball 68. The pin 67 fits loosely within the bore 69 of bushing 71, the ball 68 forming an antifriction bearing for supporting the lower end of the hub 62. The upper end of the hub 62 is formed with a bore 74 which receives a nipple 75 projecting downwardly from a stud 76. The stud 76 is constructed with a passageway 77 within the same which communicates with the bore 78 of a tube 79 secured thereto. The tube 79 is connected to a tube fitting 81 attached to the wall 41 of the upper half 37 of case 36. When water under pressure is directed to the bore 78 of tube 79, the same flows through the passageway 77 of the stud 76 and to the chamber 63 of the rotor 61 and is discharged from the rotor through the bores 60 of the tubes 64. The reaction of the water in striking the bent ends 65 of the tubes 64 causes rotation of the rotor 61. The weight of the rotor 61 is carried on the ball 68 and the said rotor being closely balanced, offers no appreciable friction between the nipple 75 and the hub 62 at the locality of the bore 74 therein. The rotor 61 thus travels freely and with maximum efficiency.

The hub 62 of rotor 61 is constructed with a spur pinion 82 which meshes with a spur gear 83 mounted on a tubular shaft 84. The shaft 84 is rotatably mounted on a stud 85 which is secured to the plate 52 and extends upwardly therefrom. The shaft 84 is held in place by means of a screw 86 which is threaded into the end of the stud 85 and a washer 90 which is clamped between said screw and stud. The shaft 84 has formed on it a spur pinion 86 which meshes with a spur gear 87. Spur gear 87 is similarly secured to a hollow shaft 187 which has attached to it a spur pinion 88. Shaft 187 is supported for rotation similarly to the shaft 84. Pinion 88 meshes with a spur gear 89 which is secured to a spur pinion 91. The pinion 91 and the gear 89 are rotatably mounted in the same manner as the tubular shaft 84. The pinion 91 meshes with a spur gear 92 secured to the upper end of the shaft 55. By means of the gear train described, the rotor 61 travels at a relatively high rate of speed, procuring rotation of the shaft 55 at a greatly reduced rate of speed.

To prevent water which leaks into the bearing 54 and past the boss 53 from reaching the ball bearing 55, the following construction is employed: Encircling the shaft 55 within the sleeve 51 is a tubular guard 93. This guard is formed with a reduced portion 94 which fits tightly about the shaft 55 in proximity to the bearing 56 and which may be soldered or otherwise secured to said shaft to form a water-tight connection therebetween. In the shaft 55 is formed a longitudinal bore 95 which communicates with the socket 72 and extends a short distance beyond the cap 58. A transverse hole 96 in the shaft 55 immediately above the reduced portion of the guard 93 communicates with the bore 95. A similar hole 97 in the shaft 55 below the cap 58 also communicates with this bore. The lower end of the boss 53 is constructed with an annular groove 98 which receives the upper end of the guard 93 and forms in conjunction therewith a break for preventing the flow of water entering the guard 93 from spilling out over the said tube and into the interior of the sleeve 51. It will thus be seen that any water leaking past the bearing 54 will pass into the interior of the guard 93 and will enter the hole 96, passing through the bore 95 and being discharged from the shaft 55 through the hole 97 at a locality below the bearing 56, thus bypassing said bearing.

The hub 31 of the spider 29 is adapted to rest upon and be supported by a revolving support 101 mounted on the end of the shaft 55. The hub 31 is constructed with a bore 102 which receives a cylindrical portion 103 of the support 101. This cylindrical portion has issuing outwardly from it a flange 104 on which the hub 31 rests. The lower end of the shaft 55, designated by the reference numeral 105 is reduced in diameter and extends through the support 101. This portion of the shaft is threaded to receive a nut 106 which securely attaches the said support to the end of the shaft. It will thus be comprehended that the rack B is rotatably mounted on the end of the shaft 55 and travels at a relatively low rate of speed upon operation of the motor C.

For the purpose of guarding the motor C, and to cause the placement of the drinking vessels upon the supporting surface of the table 25, an annular guard 107 is employed which is disposed at the forward portion of the housing A and immediately in front of the opening 23 therein. For supporting this guard, the attaching member or bracket 108 is employed which comprises, in addition to the base 110, an annular flange 109 depending therefrom. This flange is threaded to receive two thumb screws 111 which extend through the guard 107 and serve to securely attach the same thereto. When in position, the lower edge of the guard 107 extends above the ring 28 of rack B and prevents the drinking vessels from being placed inwardly of the same, thus causing the proper positioning of the drinking vessels upon the table 25.

Water for the operation of the motor C comes from two tubes 112 and 113 which are attached to tube fittings 112ª and 113ª adapted to be connected to suitable sources of supply for hot and cold water. The tube 112 is connected by means of a tube connection 114 with a valve 115, while the tube 113 is connected by means of a tube connection 116 with a valve 117. Inasmuch as both of the valves 115 and 117 are identical in construction, only the valve 117 will be described in detail. This valve comprises a valve body 118 which is secured to the bracket 108 by means of a screw 119 which extends through said bracket and is threaded into the valve body. The valve body 118 is provided with a chamber 121 and with a passageway 122 communicating therewith. A valve seat 123 encircles the passageway 122 where the same enters the chamber 121. The passageway 122 communicates with the tube 112 and forms the inlet passageway of the valve. Attached to the body 118 by means of threads 124 is a bonnet 125 which is internally threaded to receive a threaded valve stem 126. The valve stem 126 has attached to the end of it a valve head 127 which is adapted to engage the seat 123 when the valve stem 126 is rotated. A stuffing box 128 prevents leakage of water past the stem 126. The valve stem 126 extends outwardly through the forward portion of the wall 15 of housing A and through the skirt 19 of the top 18 and is provided at its outermost end with a handle 129 by means of which the same may be manipulated. Extending between the two valves 115 and 117 is a conduit 131 which communicates with both of the chambers 121 in said valves. This conduit is formed with an outlet passageway 132 which is connected to a tube 133 by means of a tube connection 134. The tube 133 is connected to a pressure-regulating valve 135 which is supported by said tube and which, in turn, is connected by another tube 136 with the tube fitting 81 at the end of the tube 79 which supplies water to the motor C. It will thus be comprehended that water of any desired temperature and at any pressure within the range of the apparatus, may be conducted to the motor C.

The pressure-regulating valve 135 is shown in detail in Figs. 6, 7 and 8. This pressure-regulating valve includes a body 137 having a longitudinal passageway 138 therein. This passageway is enlarged at one end to form a chamber 139 and a tapered valve seat 141 therebetween. Within the chamber 139 is provided a ball 142 adapted to fit against the valve seat 141. The tube 136 is attached to the body 137 and communicates with the passageway 138, while the tube 133 is attached to said body and communicates with the chamber 139 through a short passageway 143. Movement of the ball 142 toward the valve seat 141 is controlled by means of a plunger 144 which is slidably mounted in the bore 145 of a screw 146 threaded to screw into the outer end of the passageway 138. A compression coil spring 147, disposed within the bore 145 and seated against the plunger 144, urges said plunger outwardly. Movement of the ball 142 in the opposite direction is limited by means of an adjusting screw 148 which is screwed into a threaded plug 149. This plug is itself screwed into the body 137 at the end of the chamber 139. A lock nut 151 serves to hold the screw 148 in adjusted position.

Extending around the valve seat 141 is a by-pass 152 which communicates with the passageway 138 and the chamber 139 as best shown in Figs. 6 and 8. A volume control screw 153 is threaded into the body 137 and extends up into the by-pass 152 intermediate the ends thereof. By adjusting the screw 153, the amount of water passing through the passageway may be controlled at will. A lock nut 154 on this screw holds the same in adjusted position.

The operation of the pressure-regulating valve 135 is as follows: The greater percentage of the water passing to the motor C passes through the by-pass 152. This volume is determined by adjusting the screw 153. A small part of the water passes through the passageway 138 and past the valve ball 142. The quantity of water so flowing is controlled by the position of the screw 146 and the pressure exerted by the spring 147. When the pressure of the water in the tube 136 increases, the pressure on the ball 142 causes the same to move toward the seat 141 against the action of the spring 147 and to control the amount of water passing therethrough, thus maintaining the pressure substantially constant. When the pressure in the tube 136 is reduced, the spring 145 forces the ball 142 outwardly and more water flows through the passageway 138, thus again equalizing the pressure. In this manner, uniform pressure is at all times had for operation of the motor C.

The spray system of the invention includes an upper spray unit 161 and a lower spray unit 162 which are both fed from water discharged from the motor C. For this purpose, a tube fitting 163 is employed which is attached to the wall 41 of the upper half 37 of case 36 and which communicates with the interior of the said case. This tube fitting has connected to it a tube 164 which extends rearwardly and is connected to a tube fitting 165 at the rearward portion of the housing A immediately below the top 17 thereof.

The spray unit 161 comprises two branch tubes 166 and 167 which are connected to the tube fitting 165 and which are arranged in the form of loops, the ends 168 thereof being closed. Along these branch tubes are provided spray nozzles 169 which may be constructed in any suitable manner. These spray nozzles have outlets 171 in them through which water passing through the branch tubes may be discharged downwardly toward the rack B. The various spray nozzles 169 are arranged to direct the water at the proper angle with respect to drinking vessels to wash the surfaces thereof as the device operates.

Extending downwardly from the tube fitting 165 is a feed tube 172 which delivers water to the spray unit 162 and which is connected at its lower end to another tube fitting 173. The spray unit 162 as best shown in Fig. 2 comprises two arcuate manifolds 174 and 175 which extend along the wall 15 of the housing A and are connected to the tube fitting 173. Extending radially and inwardly from the manifolds 174 and 175 are branch tubes 176, 177, 178, 179 and 181 which communicate therewith and which are closed at their outer ends. These branch tubes have attached to them spray nozzles 182, similar to the spray nozzles 171 which are attached to the tubes 166 and 167. These spray nozzles have outlets 183 which direct the water entering the nozzles outwardly and toward the top 17 of the case A.

The operation of the device is as follows: The motor C is first set in operation by opening the two valves 115 and 117 which are controlled by the handles 129 attached to the operating stems 126 thereof. By properly adjusting these valves, water of any desired temperature is conducted to the motor C. The two streams of water are mixed in the conduit 131 and pass through the conduit 133, the pressure reducing valve 135 and through the conduit 136 and into the motor C. On entering the motor, the water passes through the tube 79 and into the rotor 61 which is caused to rotate. The said rotor discharges the water into the interior of the case 36 and the water so discharged leaves the case through the tube 164. After the motor is started, the drinking vessels to be washed are inserted through the opening 23 in housing A and placed in inverted position upon the table 25 of rack B. The water, on leaving the tube 164, is conducted to the two spray units 161 and 162. From these units, the water is discharged through the various nozzles 169 and 182 thereof, and engages the drinking vessels arranged upon the rack B. It will be noted that the outlets 183 are disposed between the rings 26, 27 and 28, so that the sprays issuing therefrom are discharged upwardly, where the same may enter the interior of the drinking vessels placed upon the rack B, and clean the same. The spray nozzles from the unit 161 operates in a similar manner to direct water downwardly upon the exterior surface of the various drinking vessels passing through the machine. As the machine operates, the vessels are carried continuously through the machine and when arriving at the opening 23 in housing A, may be manually removed from rack B. If desired, vessels may be allowed to repeatedly travel through the machine and subsequently removed when desired for use.

The advantages of our invention are manifest. An extremely simple and practical construction is provided, in which drinking vessels may be inserted and subsequently removed therefrom clean and sanitary. The water used in cleaning the vessels is first employed to impart rotary movement to the supporting rack, so that no separate source of energy for operating the motor is required. Thus, considerable economy in operation of the device results. The device is extremely easy to operate and to maintain in operating condition. Due to the disposition of the motor at the uppermost portion of the housing and due to the complete enclosing of the same, injury thereto is prevented, and the accumulation of dirt on the operating parts of the same is completely eliminated, so that the motor will operate indefinitely without attention. By means of the construction used in connection with the motor, water is by-passed around the lowermost bearing, whereby positive and continuous operation of the rack is made possible.

Changes in the specific form of our invention, as herein described, may be made within the scope of what is claimed without departing from the spirit of our invention.

Having described our invention, what we claim as new and desire to protect by Letters Patent is:

1. In a machine for washing drinking vessels, a housing having a wall structure forming a washing chamber and having a lateral opening therein for access to said chamber, said housing including a top, a motor suspended from said top and disposed within said chamber, a revoluble rack for drinking vessels depending from said motor and driven thereby, said rack having an annular supporting surface for supporting the drinking vessels, means fixed relative to the housing for spraying water on the drinking vessels as they are carried around by the rack, a curved guard conforming in curvature to the inner confines of the supporting surface of said rack and concentric with the axis of the shaft, said guard enclosing said motor and extending downwardly toward said rack.

2. In a machine for washing drinking vessels, a housing having a wall structure forming a washing chamber and having a lateral opening therein for access to said chamber, a motor within said housing and disposed at the upper portion thereof, said motor having a case and a rotor within said case, means for conducting water under pressure to said rotor, said water discharging into said case, a neck extending downwardly from said case, bearings in the upper and lower ends of said neck, a shaft rotatably mounted in said bearings and driven by said rotor, a rack carried by said shaft, a tubular guard encircling said shaft and disposed within said neck, said guard at the lowermost end thereof being secured to said shaft and above its locality of attachment thereto being spaced from said shaft and neck, the uppermost bearing extending into said guard, a passageway in said shaft communicating with the space between said shaft and tubular guard and discharging outwardly at a locality below the lowermost bearing, and means fixed relative to the housing for spraying water on the drinking vessels as they are carried around by the rack.

3. In a machine for washing drinking vessels, a housing having a wall structure forming a washing chamber and having a lateral opening therein for access to said chamber, a motor within said housing and disposed at the upper portion thereof, said motor having a case and a rotor within said case, means for conducting water under pressure to said rotor, said water discharging into said case, a neck extending downwardly from said case, bearings in the upper and lower ends of said neck, a shaft rotatably mounted in said bearings and driven by said rotor, a rack carried by said shaft, and means within said neck and cooperating with said shaft for by-passing water leaking through the uppermost bearing and past the lowermost bearing.

4. In a machine for washing drinking vessels, a housing having a wall structure forming a washing chamber and having a lateral opening therein for access to said chamber, a motor within said housing and disposed at the upper portion thereof, said motor having a case and a rotor within said case, means for conducting water under pressure to said rotor, said water discharging into said case, a neck extending downwardly from said case, bearings in the upper and lower ends of said neck, a shaft rotatably mounted in said bearings and driven by said rotor, a rack carried by said shaft, a passageway in said shaft having an inlet above the lowermost bearing and an outlet below the lowermost bearing and means within said neck for conducting the water leaking past said upper bearing into the inlet.

WALTER F. OHME.
RAY C. STEPHAN.